C. C. MAU.
FISH HOOK.
APPLICATION FILED JAN. 2, 1915.

1,156,795.

Patented Oct. 12, 1915.

C. C. Mau
Inventor

Witnesses by C. A. Snow & Co.
Attorneys

UNITED STATES PATENT OFFICE.

CLAYTON C. MAU, OF FREDONIA, NEW YORK.

FISH-HOOK.

1,156,795.  Specification of Letters Patent.  Patented Oct. 12, 1915.

Application filed January 2, 1915. Serial No. 234.

*To all whom it may concern:*

Be it known that I, CLAYTON C. MAU, a citizen of the United States, residing at Fredonia, in the county of Chautauqua and State of New York, have invented a new and useful Fish-Hook, of which the following is a specification.

The present invention appertains to fish hooks, and aims to provide a novel and improved spring hook for catching fish and other game.

It is the object of this invention, to provide a device of the character indicated, embodying a pair of separable hooks, and means for holding them in set position, adjacent one another, so that the fish in the act of biting or swallowing the bait carried by the hooks will release them, and whereupon the hooks will separate and embed themselves in the flesh of the fish, to facilitate the catching of the fish and to prevent the escape thereof.

Another object of the invention is the provision of a catch or detent applied to the device in a unique manner, for holding the hooks set, and whereby the hooks will be instantly released when they are pressed together slightly by the jaws of the fish.

It is also within the scope of the invention to provide a fish hook of the nature specified, which is comparatively simple, non-encumbering and inexpensive in construction, as well as being convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in its preferred embodiment in the accompanying drawing, wherein:—

Figure 1:
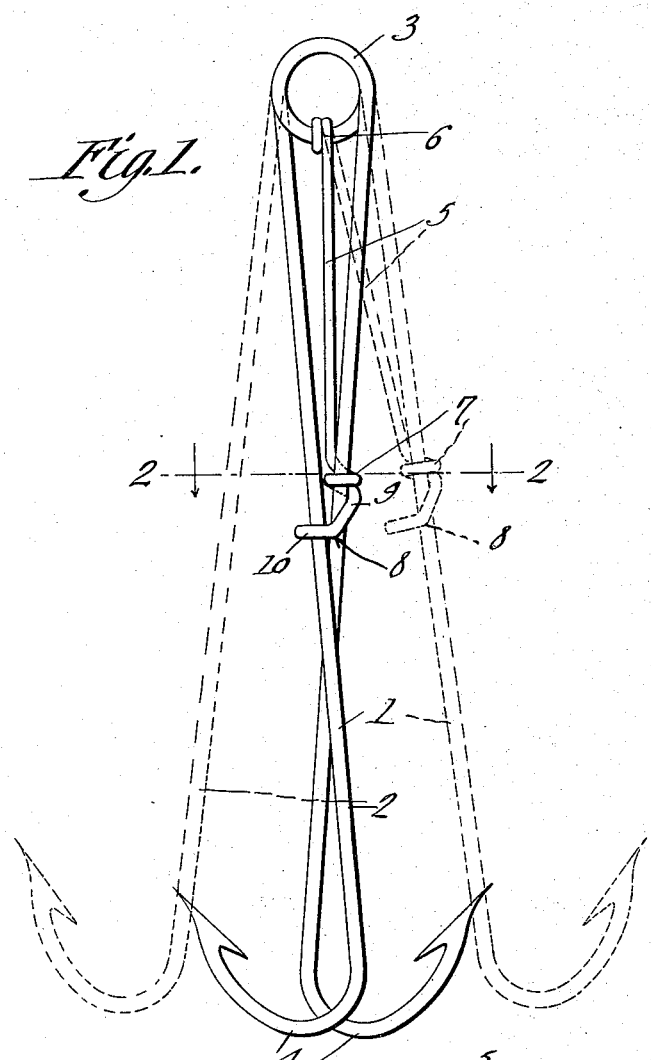
Figure 2:
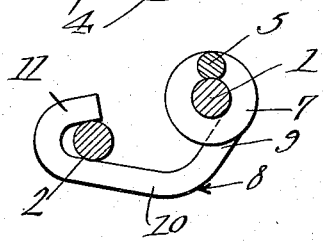

Figure 1 is a side elevation of the improved fish hook, illustrating the parts set in full lines, and released in dotted lines. Fig. 2 is an enlarged sectional detail taken on the line 2—2 of Fig. 1.

The present device embodies a pair of spring separated hooks, and to this end, there is employed a pair of shanks or arms 1 and 2, connected at one end by a coil spring 3, and having the barbed hooks 4 at their other or free ends. The hooks 4 are turned away from each other, and the foregoing parts are preferably constructed of a single length of wire or other suitable stock, possessing the requisite resiliency to enable the shanks 1 to spring apart and to be flexed together in crossed relation for the proper operation of the device. The spring 3 is of such tension, as to yieldably separate the shanks 1 and 2 when they are released, whereby the hooks 4 will be separated.

A catch or detent is carried by one of the shanks or arms for the engagement of the other one, to hold the shanks in set position, and in which position they will be crossed, as seen in full lines in Fig. 1, with the hooks 4 overlapped to occupy a relatively small space. Thus, a wire 5 is disposed obliquely between the coil 3 and shank 1, and has a coil 6 at one end wound upon or embracing the coil 3 between the shanks 1 and 2, and has a coil 7 adjacent its other end embracing the shank 1 intermediate the ends thereof. The catch or detent proper is carried by that end of the wire or brace 5 having the coil or loop 7, and embodies a bent or curved finger 8 projecting from the coil 7, and arranged at an angle relative to the shank 1, so as to deflect weeds and other foreign objects away from the finger 8, in order that the said finger may not catch weeds, or become clogged therewith. The finger 8 has the basal portion 9 which is arranged at approximately an acute angle with the shank 1, and a portion 10 arranged at an obtuse angle with the portion 9 and the free end of the finger 8 is provided with a hook 11 projecting toward the shank 1 and arranged to receive and hold the shank 2 when the parts are set. The finger 8, which forms the catch or detent, is preferably flexible, or resilient, in order that the catch 8 and shank 2 may be properly engaged to one another and released from each other. It is desirable that the shank 2 and catch or finger 8 be of such a tension as to separate when the hooks 4 are pressed together, in order that the shank 2 will be released from the hook 11 of the catch, to enable the shanks 1 and 2 to swing away from each other, to the dotted line position illustrated in Fig. 1. Attention is directed to the fact that the wire or element 5 will hold the catch or detent in proper operative position upon the shank 1, and will also serve to brace the corresponding parts of the device.

In use, to set the hooks 4, the shanks 1 and 2 are pressed together so that they will cross each other, as seen in full lines in Fig. 1, and the shank 2 is then engaged with the hook 11 of the catch or detent. The hooks 4 will then be held in overlapped position, as seen in full lines in Fig. 1, whereby they will occupy but little space, and the bills of the hooks will still project sufficiently for receiving the bait thereon, and for embedding within the flesh of the fish when the hooks are taken into the mouth of the fish. The hooks 4 being overlapped, may be readily taken into the mouth of the fish, it being noted that the overlapped hooks 4 occupy a space approximately the same or only slightly greater than the space occupied by a single hook. Now, when the hooks 4 are pressed together by the jaws of the fish to swallow or partake of the bait, the fish during the attempt of the fish to swallow or partake of the bait, the hooks will be released, since the shanks 1 and 2 being pressed together, will cause the hooks 11 to release the shanks 2, and in which event the spring coil 3 will separate the shanks. This will result in the hooks 4 being separated and embedded within the flesh of the fish, so that the fish will be caught, and cannot make its escape.

With the present device, the barbs need not be embedded in the flesh of the fish, to enable the device to be sprung, since the mere pressure upon the hooks will release them, and furthermore, a pull upon the line which is attached to the coil 3 is unnecessary for springing the device. The present device will be sprung notwithstanding the fact that the fish may approach it at various angles, and weeds and other foreign objects are not liable to release the hooks.

Having thus described the invention, what is claimed as new is:—

1. A device of the character described comprising a pair of separable shanks having a coil connecting them at one end and having hooks at their free ends, and an element having portions at its ends embracing the aforesaid coil and one of the shanks intermediate the ends thereof, the portion of said element which embraces the shank having a catch for the engagement of the other shank.

2. A device of the character described, comprising a pair of shanks connected at one end by a coil, and having hooks at their free ends, and a wire element having a coil at one end embracing the aforesaid coil, and having a coil adjacent its other end embracing the intermediate portion of one of the shanks, the last mentioned coil of the wire element having a finger projecting therefrom, and the finger being provided at its free end with a hook for the engagement of the other shank.

In testimony that I claim the foregoing as my own, I have hereto affixed my signature in the presence of two witnesses.

CLAYTON C. MAU.

Witnesses:
 ARCHIE ROGERS,
 EDWARD A. MAU.

Copies of this patent may be obtained for five cents each, by addressing the "Commissioner of Patents, Washington, D. C."